(12) United States Patent
Schumann et al.

(10) Patent No.: US 12,270,779 B2
(45) Date of Patent: Apr. 8, 2025

(54) COMBINED ELECTROCHEMICAL PHOSPHATE/pH SENSORS AND SYSTEMS

(71) Applicant: University of Florida Research Foundation, Inc., Gainesville, FL (US)

(72) Inventors: Todd R. Schumann, Longmont, CO (US); Yong-Kyu Yoon, Gainesville, FL (US); Renuka Bowrothu, Gainesville, FL (US); Kyoung Tae Kim, Woodinville, WA (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 384 days.

(21) Appl. No.: 17/642,555

(22) PCT Filed: Sep. 11, 2020

(86) PCT No.: PCT/US2020/050396
§ 371 (c)(1),
(2) Date: Mar. 11, 2022

(87) PCT Pub. No.: WO2021/050867
PCT Pub. Date: Mar. 18, 2021

(65) Prior Publication Data
US 2022/0326171 A1    Oct. 13, 2022

Related U.S. Application Data

(60) Provisional application No. 62/900,160, filed on Sep. 13, 2019.

(51) Int. Cl.
*G01N 27/333*    (2006.01)
*G01N 27/30*    (2006.01)
*G01N 27/403*    (2006.01)

(52) U.S. Cl.
CPC ......... *G01N 27/302* (2013.01); *G01N 27/333* (2013.01); *G01N 27/4035* (2013.01); *G01N 27/30* (2013.01)

(58) Field of Classification Search
CPC .... G01N 27/333; G01N 27/30; G01N 27/302; G01N 27/4035
See application file for complete search history.

(56) References Cited

U.S. PATENT DOCUMENTS 4,059,499 A * 11/1977 Ibsen Nielsen .... G01N 27/3335
                                                                204/418
5,336,388 A *  8/1994 Leader ................. G01N 27/403
                                                                204/422

(Continued)

FOREIGN PATENT DOCUMENTS

| KR |    20080082208 A  * |  9/2008 | ........... G01N 27/333 |
| WO | WO 20120154028 A1 * | 11/2012 | ........... G01N 27/333 |
| WO |    2016032314  A1  |  3/2016 | |

OTHER PUBLICATIONS

Xu et al., "Development and Performance of an All-Solid-Stated pH Sensor Based on Modified Membranes," Int. J. Electrochem. Sci., 13 (2018) 3080-3090, doi: 10.20964/2018.03.04, pp. 3080-3090 (Year: 2018).*

(Continued)

*Primary Examiner* — Alexander S Noguerola
(74) *Attorney, Agent, or Firm* — Thomas | Horstemeyer, LLP

(57) ABSTRACT

Various examples are provided related to electrochemical phosphate/pH (P/pH) sensors, systems and related methods. In one example, a P/pH sensor includes a substrate and collocated phosphate (P) electrode and pH electrode formed on a surface of the substrate. The P electrode includes a cobalt (Co) sensing window disposed on a first copper (Cu) sensor pad; and the pH electrode includes an antimony (Sb) sensing window disposed on a second Cu sensor pad. The P/pH sensor can include a reference electrode, and may also include other sensor electrodes such as, e.g., a nitrate electrode.

19 Claims, 11 Drawing Sheets

(56) References Cited

U.S. PATENT DOCUMENTS

2005/0098434 A1* 5/2005 Gundel .............. G01N 27/3272
 204/403.02
2017/0153201 A1 6/2017 Li et al.

OTHER PUBLICATIONS

Wang et al., "Phosphate Sensors Based on Co—Cu Electrodes Fabricated with a Sacrificial Glass Fiber Paper Template," 2015 IEEE Sensors, 1-4 (Year: 2015).*
Sten O. Engblom, "Determination of inorganic phosphate in a soil extract using a cobalt electrode," Plant and Soil 206: 173-179, 1999 (Year: 1999).*
Machine-generated English language translation obtained from the KIPO of Hyo et al. KR 20080082208 A, patent published Sep. 11, 2008 (Year: 2008).*
International Search Report for PCT/US2020/050396 mailed Feb. 3, 2021.
Caflisch, et a., "Manufacture and Utilization of antimony pH electrodes", Kidney International, vol. 14, 1976.
Choi, et al., "Multi-analytse needle-type sensor for Measurement of pH, Phosphate, and Redox in Soil", IEEE Sensors 2010 Conference.
Bowrothu, et al., "Integrated phosphate and pH sensing system for water quality monitoring", 2020 IEEE 33rd International Conference on Micro Electro Mechanical Systems (MEMS); Apr. 2020.

* cited by examiner

PCB milled sensors

Electrodes after electrodeposition

COMBINED ELECTROCHEMICAL PHOSPHATE/pH SENSORS AND SYSTEMS

CROSS REFERENCE TO RELATED APPLICATIONS

This application is a national stage entry pursuant to 35 U.S.C. § 371 of Patent Cooperation Treaty (PCT) international application No. PCT/US2020/050396, filed on Sep. 11, 2020 which claims priority to, and the benefit of the filing date of, U.S. provisional application No. 62/900,160, filed on Sep. 13, 2019, entitled "COMBINED ELECTROCHEMICAL PHOSPHATE/pH SENSORS AND SYSTEMS" which are all hereby incorporated herein by reference in their entireties.

STATEMENT REGARDING FEDERALLY SPONSORED RESEARCH OR DEVELOPMENT

This invention was made with government support under 1439644 awarded by The National Science Foundation. The government has certain rights in the invention.

BACKGROUND

Phosphorous (P) is essential for plant growth and development but it is one of the least bio-available nutrients and the second most limiting nutrient for some plants such as the potato. Due to misuse, up to 80% of applied phosphate fertilizers is not absorbed by plants but leaches to coastal water such as rivers, lakes, and seas, causing water contamination and eutrophication. Since phosphate mineral resources are not renewable, a "P crisis" will be faced in a few decades which will threaten the ability to provide a sustainable food supply. Currently, most nutrient analysis systems rely on optical spectroscopy in the visible and ultraviolet range. While the optical approach provides reliable data, the system is usually bulky, complex, power-consuming, and expensive. Therefore, its usage for a broad range of coastal nutrient monitoring is very limited.

SUMMARY

Aspects of the present disclosure are related to electrochemical phosphate/pH sensors, systems and related methods. These sensors can be used for environmental monitoring. In one aspect, among others, a phosphate/pH (P/pH) sensor comprises a substrate; a phosphate (P) electrode formed on a surface of the substrate, the P electrode comprising a cobalt (Co) sensing window disposed on a first copper (Cu) sensor pad; and a pH electrode formed on the surface of the substrate and collocated with the P electrode, the pH electrode comprising an antimony (Sb) sensing window disposed on a second Cu sensor pad. The Co sensing window and the Sb sensing window can chave diameters in a range from about 1 mm to about 3 mm. The first and second Cu sensor pads can have diameters that are about twice the diameter of the corresponding Co or Sb sensing window. The Co and Sb sensing windows can be the same size or different sizes.

In one or more aspects, the P/pH sensor can comprise a reference electrode formed on the surface of the substrate and collocated with the P electrode and the pH electrode. The reference electrode can be located between the P electrode and the pH electrode. The reference electrode can comprise a platinum (Pt) sensing window disposed on a third Cu sensor pad. The Co, Pt and Sb sensing windows can be the same size. The Pt sensing window can have a diameter in a range from about 1 mm to about 3 mm. The third Cu sensor pad has a diameter that is about twice the diameter of the Pt sensing window. The first and second Cu sensor pads can be separated from the third Cu sensor pad by a separation distance equal to a radius of the Pt sensing window. The P/pH sensor can comprise a nitrate electrode formed on the surface of the substrate and collocated with the P electrode and the pH electrode, the nitrate electrode comprising a selective membrane disposed on a third Cu sensor pad. The selective membrane can be a polyvinyl chloride (PVC) based membrane.

In another aspect, a method for forming a combined phosphate/pH (P/pH) sensor comprises forming first, second and third sensor pads on a common substrate, the first, second and third sensor pads comprising: a base copper (Cu) layer disposed on the common substrate; and a platinum (Pt) layer disposed over the Cu layer; covering the first, second and third sensor pads with a coating of SU-8; defining sensor windows on the first, second and third sensor pads by patterning the coating of SU-8; forming a phosphate (P) sensing electrode by disposing a layer of cobalt (Co) over the Cu layer in the sensor window of the second sensor pad; and forming a pH sensing electrode by disposing a layer of antimony (Sb) over the Cu layer in the sensor window of the third sensor pad. The first, second and third sensor pads can comprise: the base Cu layer disposed on the common substrate; a chromium (Cr) layer disposed on the base Cu layer; the Pt layer disposed on the Cr layer; a first titanium (Ti) layer disposed on the Pt layer; a second Cu layer disposed on the first Ti layer; and a second Ti layer disposed on the second Cu layer. A reference electrode can be formed by removing the second Ti layer, the second Cu layer and the first Ti layer from the sensor window of the first sensor pad. The P sensing electrode can be formed by removing the second Ti layer from the sensor window of the second sensor pad and disposing the layer of Co on the second Cu layer in the sensor window of the second sensor pad. The pH sensing electrode can be formed by removing the second Ti layer from the sensor window of the third sensor pad and disposing the layer of Sb on the second Cu layer in the sensor window of the third sensor pad.

In one or more aspects, the first, second and third sensor pads can be collocated on the common substrate, the first sensor pad located between the second and third sensor pads. The first, second and third sensor pads can be formed using PCB milling machine or silicon microfabrication techniques. The method can further comprise: forming a fourth sensor pad on the common substrate with the first, second and third sensor pads, the fourth sensor pad comprising the base Cu layer and the Pt layer; and forming a nitrate sensing electrode by attaching a selective membrane over the fourth sensor pad. The selective membrane can be a polyvinyl chloride (PVC) based membrane. The selective membrane can be formed by: preparing a mixture of 15% wt. of tetradodecyl ammonium nitrate (TDDA), 40% wt. of nitrophenyl octyl ether (NPOE) and 45% wt. of polyvinyl chloride (PVC) dissolved in 2 mL of tetrahydrofuran (THF); and evaporating the mixture to form the selective membrane.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
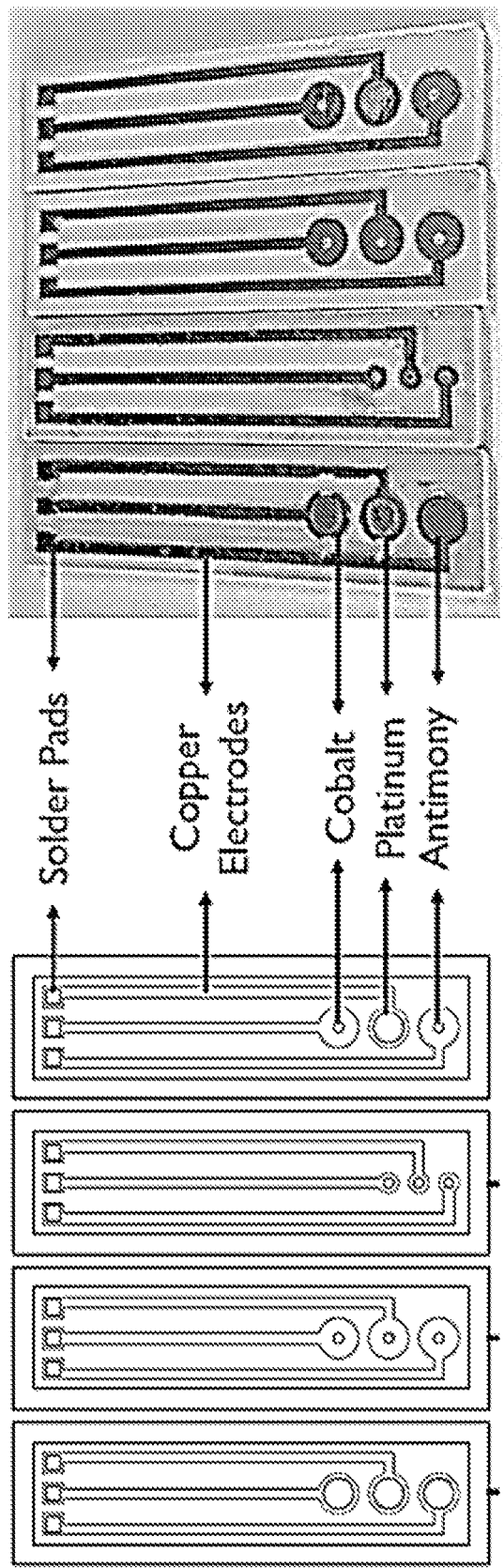
FIGS. 1A and 1B are schematic diagrams and images of examples of phosphate/pH (P/pH) sensors, in accordance with various embodiments of the present disclosure.

Disclosed herein are various examples related to electrochemical phosphate/pH sensors, systems and related methods. An integrated wireless temperature-pH-phosphate sensing system offers many advantages for real-time monitoring of coastal environment, food supply, and society. A Co-based electrochemical P sensing system integrated with a wireless module can be used. The micro solid state electrodes can be batch-fabricated using a microelectromechanical systems (MEMS) technology offering a reliable, cost-effective, low-power consumption nutrient detection system, and the integrated wireless module enables real-time (or near real-time) remote monitoring in locations such as, e.g., off-site fields, rivers, lakes, and sea coasts. The system can provide direct feedback to farmers, preventing them from over-using phosphate fertilizers. This can save on fertilizer costs, and lower the contribution to coastal contamination and eutrophication, allowing a healthy ecosystem to be sustained. Reference will now be made in detail to the description of the embodiments as illustrated in the drawings, wherein like reference numbers indicate like parts throughout the several views. The sensor can also be configured to sense other ions (e.g., nitrogen) by integrating other specialized sensing electrodes.

Since cobalt (Co) effectively responds to phosphate ions, Co can be used for phosphate ion sensing. However, its response to phosphate is greatly affected by the surrounding pH condition. Phosphate detection may be appropriately calculated taking into account each phosphate species under different pH conditions. Therefore, the combined sensors should include a pH sensor as well as the phosphate sensor. Antimony (Sb) based pH sensors and Co based phosphate sensors were developed, and integrated into combined pH and phosphate sensors, which were implemented. An additional temperature sensor was integrated as the electrochemical reaction is more or less affected by solution temperature. An integrated sensing and communication/telemetry system can be implemented in a capsule shape to best establish system compactness, portability, low power consumption, and functionality.

Phosphate Sensor

Nitrogen (N) (nitrate: $NO_3$ and ammonium: $NH_4^+$), Phosphorous (P) (phosphate: $PO_4^{3-}$, hydrophosphate: $HPO_4^{2-}$, and dihydrophosphate: $H_2PO_4^-$) and Potassium (K) (potash: $K^+$) are known as the three most important nutrients for crop growth. As for nutrient detection, electrochemical detection using an ion selective electrode (ISE) has been studied. ISEs for nitrate and potassium have been established while a dominant ISE for phosphate detection has not yet been reported.

Cobalt (Co) has been studied for phosphate ion sensing since Co effectively responds to phosphate ions. However, its response to phosphate is greatly affected by the surrounding pH condition. Cobalt's reaction in the absence and presence of phosphate ions has been evaluated. First, in the absence of phosphate ions in an aquatic solution, Co is readily oxidized and the Co electrode surface forms CoO. In the presence of phosphate ions, cobalt phosphate ($Co_3(PO_4)_2$) is formed. The different phosphate species are present under different pH conditions (e.g. acidic and base conditions). Therefore, Co electrodes for phosphate detection can be accompanied by a pH sensor to accurately assess the phosphate concentration.

The following three reactions show pH-dependent Co and phosphate reactions.

$$3CoO + 2H_2PO_4^- + 2H^+ \Leftrightarrow Co_3(PO_4)_2 + 3H_2O \text{ (at } pH\,4.0) \tag{1}$$

$$3CoO + 2HPO_4^{2-} + H_2O \Leftrightarrow Co_3(PO_4)_2 + 4OH^- \text{ (at } pH\,8.0) \tag{2}$$

$$3CoO + 2PO_4^{3-} + 3H_2O \Leftrightarrow Co_3(PO_4)_2 + 6OH^- \text{ (at } pH\,11.0) \tag{3}$$

In each case, $Co_3(PO_4)_2$ is the end product, and thus the cobalt electrode (CoO) responds to all three forms of phosphate ions, e.g. $H_2PO_4^-$(dihydrophosphate), $HPO_4^{2-}$(hydrophosphate), and $PO_4^{3-}$(phosphate) while the formation of cobalt phosphate $Co_3(PO_4)_2$ involves different reduction mechanism and phosphate species with different equilibrium potentials. Since equilibrium potentials in the electrochemical reaction are governed by Nernst's equation, the potential shift can be appropriately calculated considering each phosphate species under different pH conditions.

The Co electrode fabrication and characterization processes will now be described. Integrated phosphate/pH (P/pH) sensors were developed on a single substrate with collocated sensors as illustrated in FIGS. 1A and 1 B. The P/pH sensors include copper electrodes disposed on the common substrate. The electrodes include copper sensor pads formed at a first (or distal) end of a copper trace and copper solder pads at a second (or proximal) end of the copper trace. The copper sensor pads can be circular, rectangular, or other geometric or arbitrary shape, and are sufficiently large to accommodate the sensing window formed thereon. Layers of sensing elements (e.g., Co, Pt and Sb) are disposed on the collocated copper sensor pads to form sensing windows or areas, as will be discussed, to facilitate sensing of phosphate, temperature and pH. The sizes (window or area) of the sensor element deposited on the different copper sensor pads can be the same or can be varied as shown.

Chemicals for cobalt electrodes: Co electrodes can be electrodeposited on a copper plate cathode (substrate with Cu seed layer). For the fabricated P/pH sensors disclosed here, a cobalt source sheet (5 cm×5 cm) was used for an anode and an electrolyte solution was prepared by dissolving:

$Co(SO_4)*7H_2O$:4.3g/100 mL of water;

$H_2SO_4$:to adjust *pH* to2; and $H_3BO_3$:2.5g/100 mL water.

Co electrodeposition: In an electroplating bath, the anode (Co source sheet) and cathode (copper electrode on substrate) were placed with a separation distance of 1 cm, and Co was electrodeposited at a current density of 10 mA/cm$^2$ for 4 minutes. Electrodeposition can be carried out in a range from about 10 mA/cm$^2$ to about 50 mA/cm$^2$. The pH of the solution (e.g., in a range from about 1-2) can be controlled through the sulfuric acid.

Characterization: The phosphate sensor can be pretreated prior to characterization. The Co sensor electrode was immersed into deionized (DI) water together with the Pt reference electrode to form a cobalt oxide (CoO) layer on the surface of the copper sensor pad. After reaching a stable potential, the electrode was removed from the DI water and immersed in $10^{-4}$ M $KH_2PO_4$ solution at a pH of 7.5 until a new steady-state potential was observed. Several phosphate standard solutions were prepared with different concentrations from $10^{-4}$ to $10^{-7}$ M $KH_2PO_4$ in a pH 7.5 condition by adding potassium hydroxide. The experiments were conducted at ambient oxygen levels and room temperature.

Figure 2:
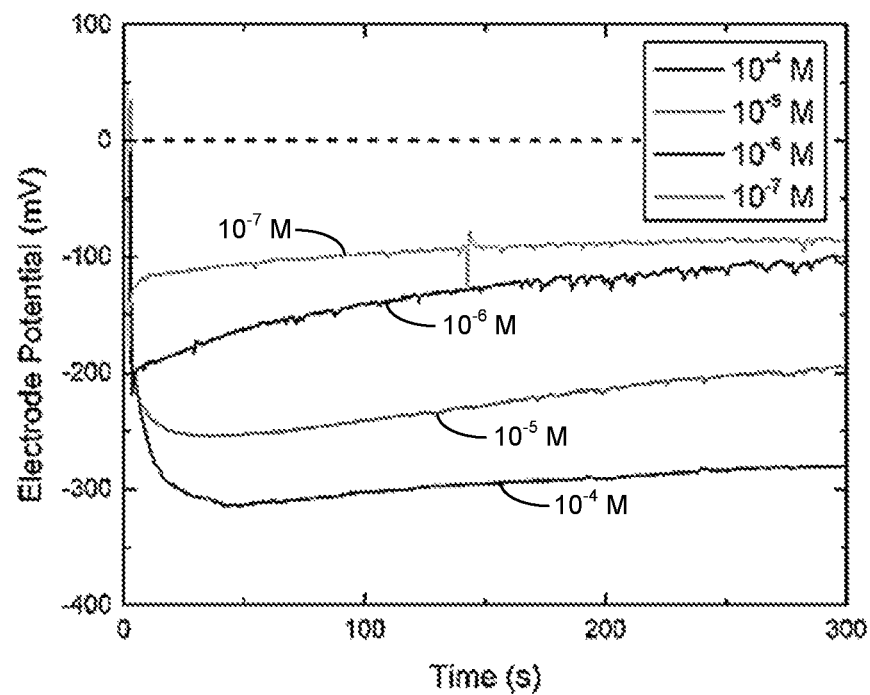
FIGS. 2 and 3 illustrate examples of measured electrode potential of Co based phosphate and Sb based pH electrodes that can be used in the P/pH sensors of FIGS. 1A and 1B, in accordance with various embodiments of the present disclosure.

FIG. 2 shows examples of measured electrode potentials of the fabricated Co electrode-based phosphate sensors for various phosphate concentrations. It is noticeable that the P sensor successfully detects as small phosphate concentration as $10^{-7}$ M (100 nM 0.01 ppm), which is comparable with that of a commercially available photometry-based phosphate sensor, 75 nM (e.g., Cycle-PO4, WET Labs, Inc.). Also, the P sensor settling time is less than 5 min, which is much shorter than the commercial sensor's sampling rate of 2 per hour and is equivalent to 30 min per sampling.

Solid State pH Sensor

A pH sensor was provided using a solid-state antimony (Sb) sensor due to its linear response to the H$^+$concentration in solution and high chemical resistance to corrosion and acids. A solid-state Sb electrode was fabricated using electrodeposition, which is a low-temperature process and compatible with the complementary metal oxide semiconductor (CMOS) process allowing compact integration between sensors and electronics. Note the electrodeposition approach is also a low-cost process with a high deposition rate and no usage of vacuum chambers as in metal sputtering and evaporation processes.

Chemicals for antimony electrodes: Sb electrodes can be electrodeposited on a copper plate (cathode). For the fabricated P/pH sensors disclosed here, a platinum mesh (5 cm×5 cm) was used for an anode, and an electrolyte solution is prepared by:

$SbCl_3$:1g;

HCl:2.5 mL; and

DI water:5 mL.

Sb electrodeposition: In an electroplating bath, the anode (Pt sheet) and cathode (copper electrode on substrate) are placed at a separation distance of 1 cm, and Sb was electrodeposited at a current density of 10 mA/cm$^2$ for 5 minutes. Electrodeposition can be carried out in a range from about 1 mA/cm$^2$ to about 10 mA/cm$^2$.

Figure 3:
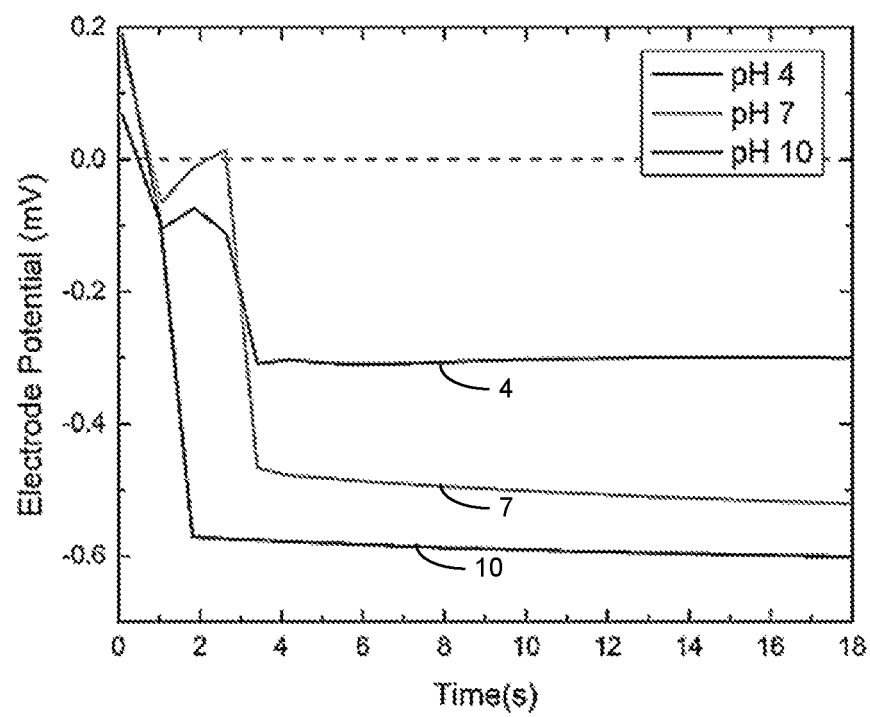

Characterization: Standard pH solutions in the range of pH 4 to 10 were prepared by mixing 100 mL Tris buffer (0.02M %) with an appropriate amount of 3M HCl for sensor characterization under ambient conditions. FIG. 3 shows examples of measured electrode potentials of the fabricated Sb electrode-based pH sensors for various pH levels. The results are comparable with that of a commercial glass body Accumet pH meter (e.g., Cole-Parmer, Inc.). The Sb sensor exhibits a good linear response and its stabilization time was less than a minute.

Combined Phosphate/pH Sensor and System

The developed phosphate and pH sensors can be integrated in a single substrate as shown in FIGS. 1A and 1B. Also, each prototype sensor module (or node) can be in a dimension of 1 cm×5 cm, having a Co electrode for phosphate detection, a Pt electrode for a reference electrode, and a Sb electrode for pH detection, with the reference Pt electrode positioned between the Co and Sb electrodes as shown in FIGS. 1A and 1B. Simultaneous detection of phosphate and pH concentration can be performed in this arrangement under various phosphate and pH conditions. While those three electrodes are co-located, different permeations of electrode sets can be considered for sensor design optimization with different sensing window (or area) sizes and relative positions (distances between sensing windows or areas). The sensor window sizes are 1 mm or 3 mm in diameter while can be further reduced if the sensitivity is not significantly degraded. The size of the sensor window can be in a range from about 10 μm to about 10 mm, from about 100 μm to about 10 mm, from about 1 mm to about 10 mm, from about 1 mm to about 7 mm, from about 1 mm to about 5 mm, from about 1 mm to about 3 mm, or combinations thereof. While circular sensor windows are shown in the drawings, other shapes (e.g., rectangular, hexagon, or other geometric or arbitrary shapes) may be used. The separation distance (or spacing) between adjacent sensing windows can be about one half to about twice the size (or diameter) of the sensing windows.

Figure 4A:
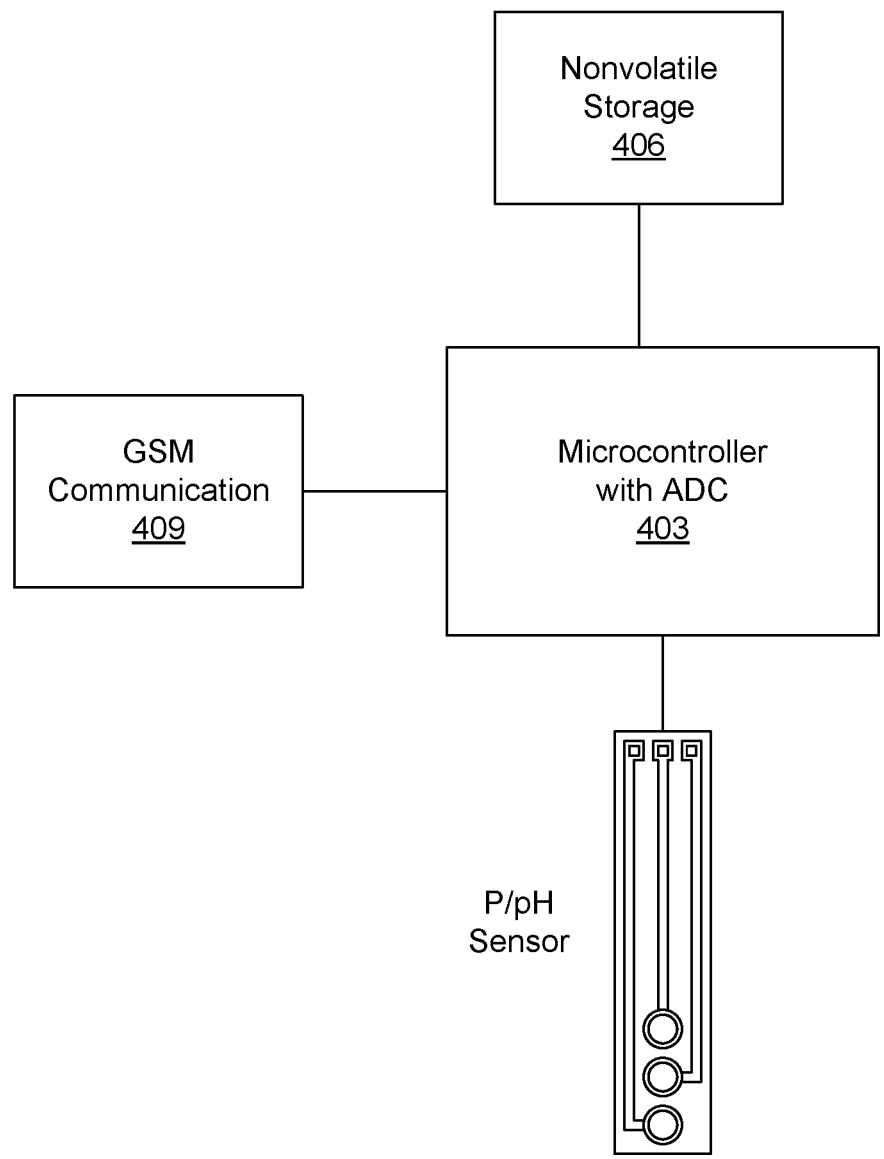
FIGS. 4A and 4B are a schematic diagrams illustrating a system for measurement and communication of data acquired from the P/pH sensors of FIGS. 1A and 1B, in accordance with various embodiments of the present disclosure.
Figure 4B:
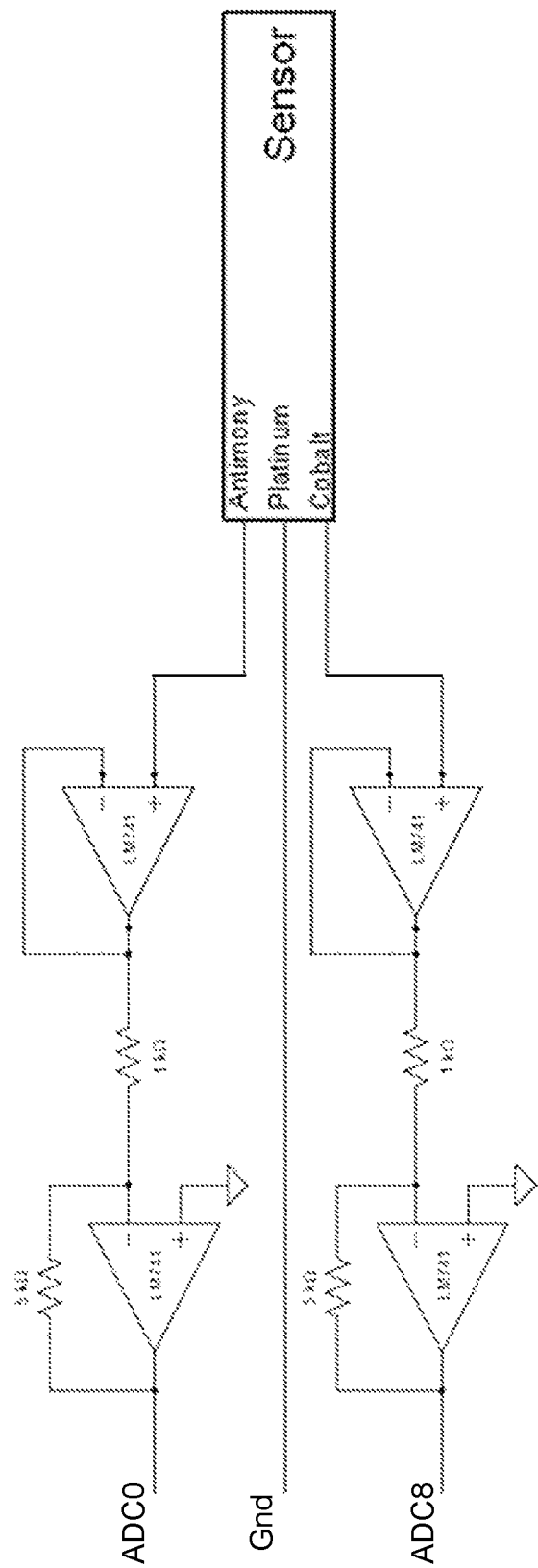

One or more of the P/pH sensors can be coupled to a microcontroller 403 (e.g., Arduino Mega) including an analog-to-digital converter (ADC) that can sample data from each sensor on the P/pH sensors, as illustrated in FIG. 4A. The microcontroller 403 can be configured to simultaneously sample all of the Co, Pt and Sb electrodes of a P/pH sensor. The sampled data can be stored in memory 406 (e.g., nonvolatile storage) for subsequent access and/or transmission through a communication interface 409 (e.g., global system for mobile (GSM) communication, Bluetooth®, WiFi, cellular or other RF wireless communication). For instance, data collected from the P/pH sensors can be communicated to a user device (e.g., smart phone, tablet, laptop, microcontroller, etc.) for display and analysis. The data can be processed using an application executed on the user device, which can provide real-time or near real-time information for display on the user device or another device. Additional details regarding the connection between the P/pH sensor and other components depicted in FIG. 4A is provided in U.S. provisional application entitled "Combined Electrochemical Phosphate/pH Sensors and Systems" having Ser. No. 62/900,160, which is hereby incorporated by reference in its entirety. In some embodiments, the ADC of the microcontroller 403 may not have a sufficiently high internal impedance for measurement of the electrodes, which can produce issues such as movement artifacts, channel crosstalk, potential lowering and high read times. To account for this, interface circuitry can be provided between the microcontroller 403 and the sensor. For example, a voltage buffer and inverting amplifier (e.g., 5x gain) can be incorporated between the P/pH sensor and microcontroller/ADC 403. FIG. 4B shows an example of the interface circuitry comprising the buffer and amplifier.

Figure 5:
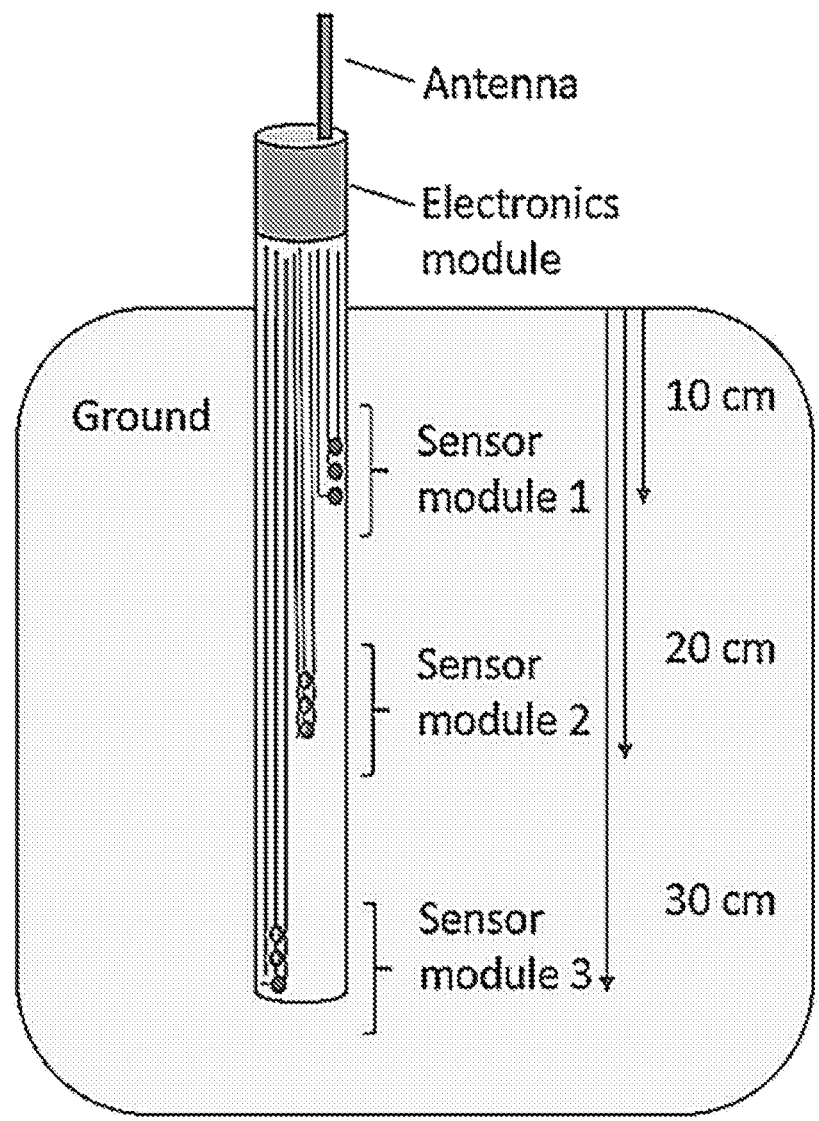
FIG. 5 is a schematic diagram illustrating a sensing system including a plurality of the P/pH sensors of FIGS. 1A and 1B, in accordance with various embodiments of the present disclosure.

A plurality of P/pH sensors can be combined for use in environmental monitoring as illustrated in FIG. 5. The example of FIG. 5 shows 5 P/pH sensor modules attached to a pole (e.g., with a total pole length of 40.75 cm) that can be inserted into the ground. Three sets of the P/pH sensor electrodes are positioned at three different depths, 10 cm, 20 cm, and 30 cm to sense spatial phosphate concentration variations with depth. Each P/pH sensor is connected to processing circuitry (e.g., as illustrated in FIGS. 4A and 4B) of an electronics module configured to read out, store and/or wirelessly communicate the collected data through an antenna connected to the top of the pole. The sensitivity and selectivity of the P/pH sensors on the pole can be tested and calibrated in various soil conditions to ensure accuracy of the measurements. The sensors can be configured to include other sensing electrodes such as, e.g., a nitrogen or other sensing electrode. Sensing electrodes can be formed using ion selective membranes such as, e.g., a $NO_3$ ion selective membrane.

Colocation Analysis

Figure 6A:
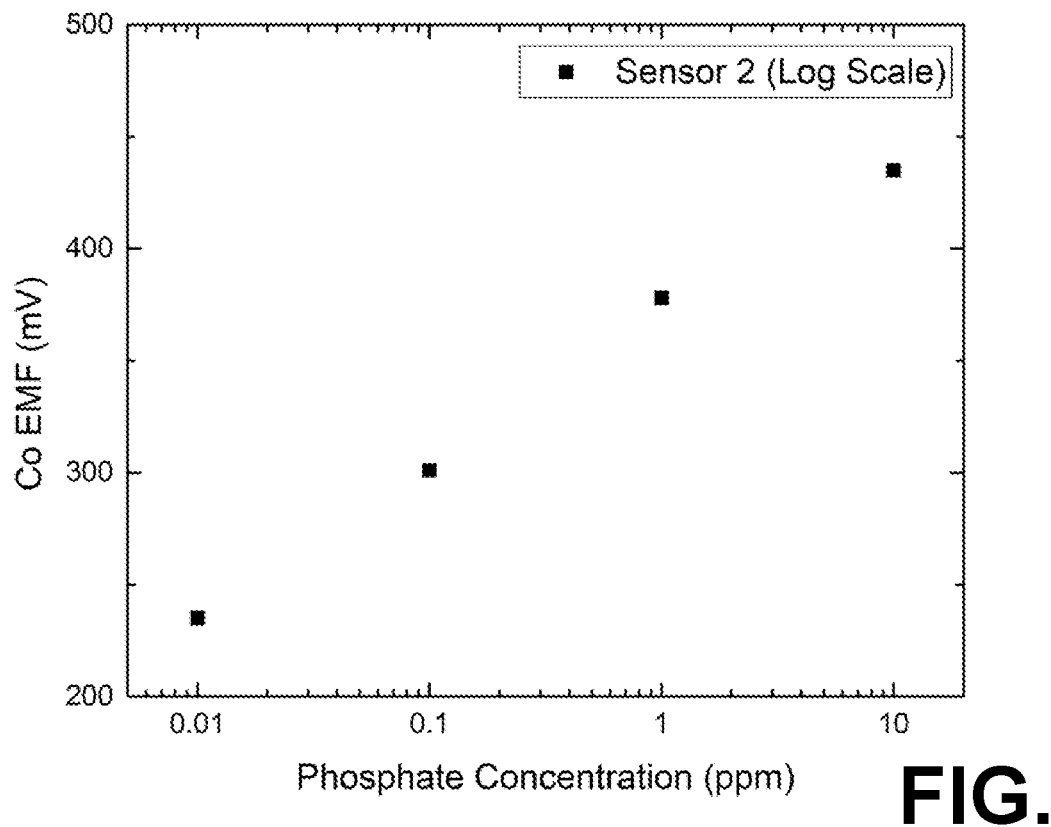
FIG. 6A illustrates an example of measured electrode potential of a Co based phosphate electrode of the P/pH sensors of FIGS. 1A and 1B at different P levels with constant pH, in accordance with various embodiments of the present disclosure.
Figure 6B:
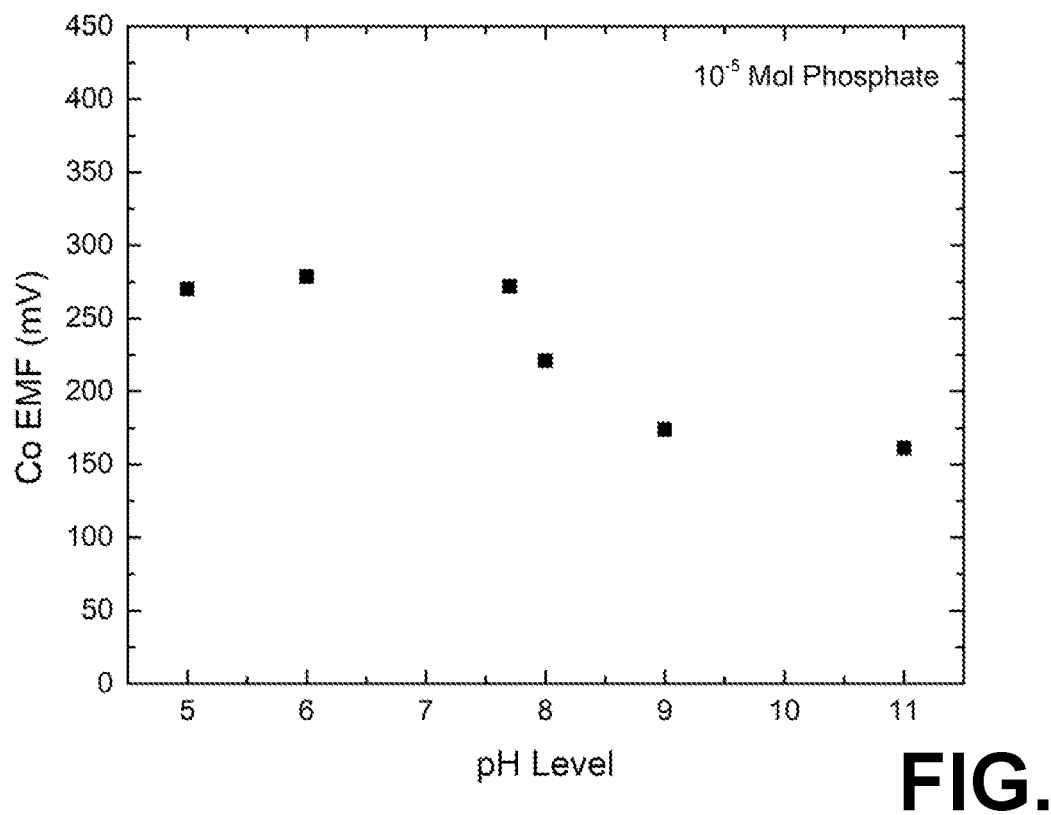
FIG. 6B illustrates an example of measured electrode potential of a Sb based pH electrode of the P/pH sensors of FIGS. 1A and 1B at different pH levels with constant P, in accordance with various embodiments of the present disclosure.

As previously described, the cobalt electrode is sensitive to phosphate in solution, producing a voltage corresponding the concentration in terms of ppm. FIG. 6A illustrates an example of the measurement of the potential of a cobalt electrode in solutions with a constant pH, but different phosphate levels. However, the pH of the solution will change with the phosphate species, resulting in a different scale depending on the pH as shown in FIG. 6B, which illustrates an example of the measurement of the potential of a cobalt electrode in solutions with a constant phosphate level, but at different pH. To account for this, a pH sensitive antimony electrode is collocated along with the phosphate sensitive cobalt electrode. The readout can then be performed using a lookup table, where the combined readings of the cobalt and antimony electrodes determine both the phosphate level and local pH of the solution near the sensor head. An example of a look up table for sensor readout is provided below. Both pH and phosphate level can be determined from the combined reading of the antimony and cobalt electrodes. The co-location allows the sensor to remove the effect of the local pH changes due to the removal of acidic species during readout.

|  | $EMF_{Co1}$ | $EMF_{Co2}$ | $EMF_{Co3}$ |
| --- | --- | --- | --- |
| $EMF_{Sb1}$ | $Phos_{11}$ | $Phos_{21}$ | $Phos_{31}$ |
| $EMF_{Sb2}$ | $Phos_{12}$ | $Phos_{22}$ | $Phos_{32}$ |
| $EMF_{Sb3}$ | $Phos_{13}$ | $Phos_{23}$ | $Phos_{33}$ |
| $EMF_{Sb1}$ | $pH_{11}$ | $pH_{21}$ | $pH_{31}$ |
| $EMF_{Sb2}$ | $pH_{12}$ | $pH_{22}$ | $pH_{32}$ |
| $EMF_{Sb3}$ | $pH_{13}$ | $pH_{23}$ | $pH_{33}$ |

Figure 7A:
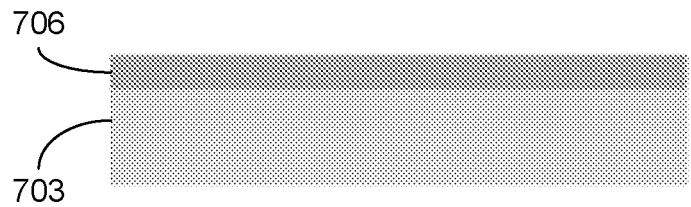
FIGS. 7A-7I graphically illustrate an example of a fabrication process for the P/pH sensors of FIGS. 1A and 1B, in accordance with various embodiments of the present disclosure.
Figure 7B:
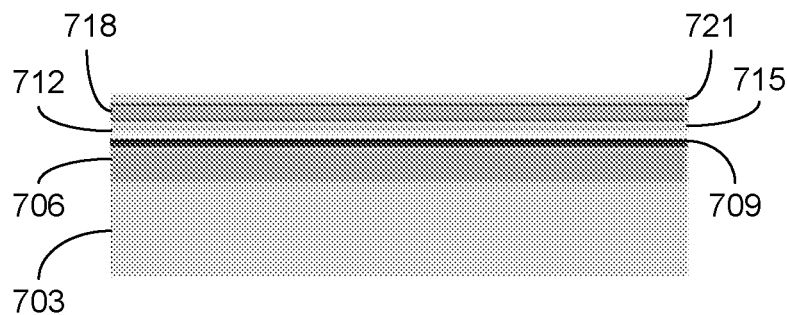
Figure 7C:
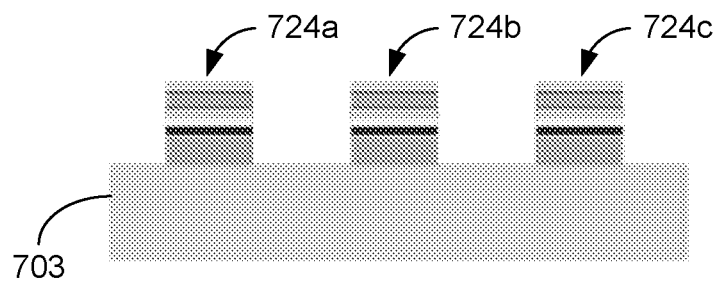

Referring next to FIGS. 7A-7I, an example of a process for fabrication of the combined P/pH sensors is described. Beginning with FIG. 7A, a substrate 703 (e.g., silicon, PCB, glass, etc.) is provided with a thick, conductive copper layer 706 (e.g., in a range from about 100 nm to about 900 nm, from about 150 nm to about 750 nm, from about 200 nm to 500 nm, or combinations thereof). As shown in FIG. 7B, layers of Cr 709 (e.g., about 50 nm), Pt 712 (e.g., about 100 nm), Ti 715 (e.g., about 50 nm), Cu 718 (e.g., about 500 nm), and Ti 721 (e.g., about 50 nm) are formed on the Cu layer 706 through deposition using a sputtering technique. The layers 706-721 are then patterned as illustrated in FIG. 7C to form sensor electrodes 724a, 724b and 724c on the substrate 703 using, e.g., PCB milling machine or silicon microfabrication techniques.

Figure 7D:
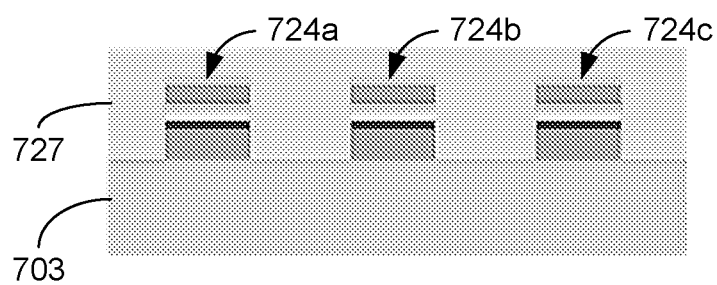
Figure 7E:
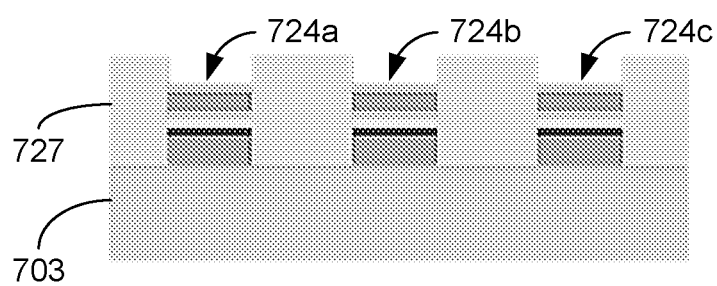
Figure 7F:
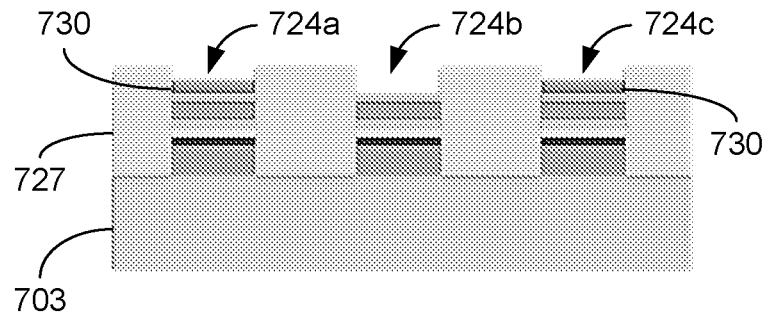
Figure 7G:
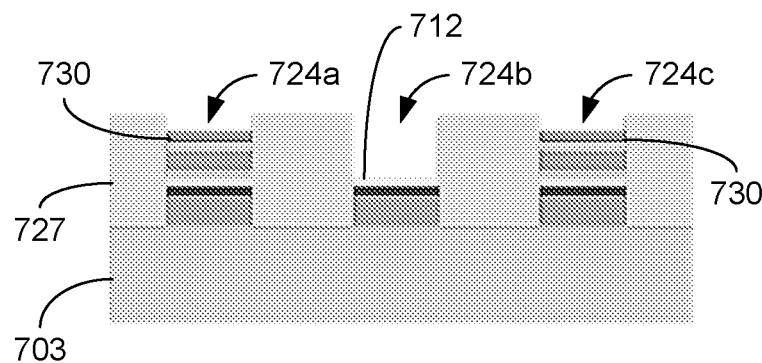
Figure 7H:
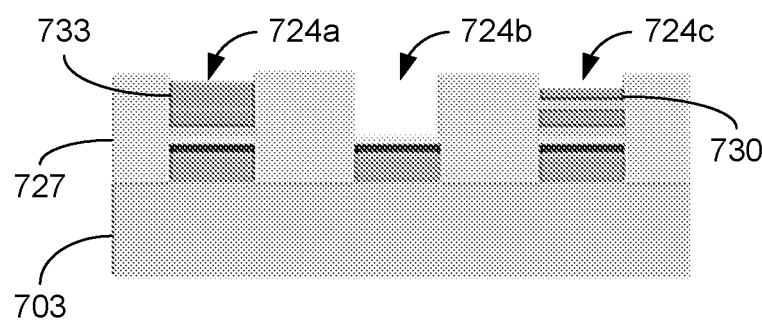
Figure 7I:
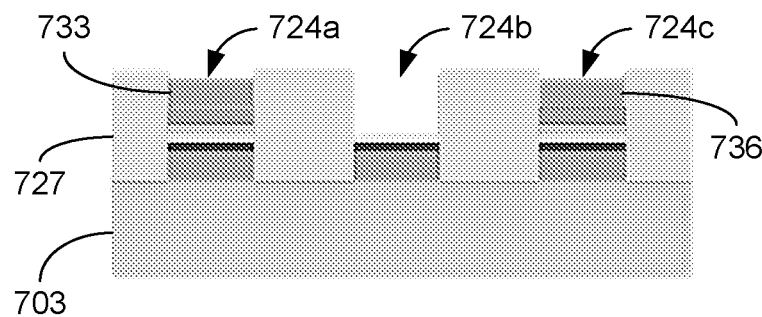

Next, the sensor electrodes 724 can be coated or covered as shown in FIG. 7D by deposition of SU-8 727 (e.g., about 60 μm) using, e.g., a spin coating technique, and then photo lithography can be used to pattern the SU-8 727 over the sensor electrodes 724 to define sensor windows on the sensor electrodes 724 with development followed by hard bake of the SU-8 727 as shown in FIG. 7E. Negative Photo Resist (PR) 730 is formed on the P and pH sensor electrodes 724a and 724c by deposition as illustrated in FIG. 7F, and Pt layer 712 exposed through, e.g., a Ti etch using diluted HF, a Cu etch using Cu etchant, and another Ti etch to form the reference electrode 724b as shown in FIG. 7G. The P sensor electrode 724a is formed by removal of the PR 730 using, e.g., acetone, followed by a Ti etch and Co electroplating to form a Co layer 733 on the Cu layer 718 as illustrated in FIG. 7H, and the pH sensor electrode 724c is formed by removal of the PR 730 using, e.g., acetone, followed by a Ti etch and Sb electroplating to form a Sb layer 736 on the Cu layer 718 as illustrated in FIG. 7I. The Co layer 733 and Sb layer 736 can be in a range from, e.g., about 50 nm to about 50 μm, from about 100 nm to about 20 μm, from about 200 nm to about 10 μm, from about 300 nm to about 5 μm, from about 500 nm to about 2 μm, or combinations thereof. A typical thickness for the Co and Sb layers is about 2 μm.

Figures 8A, 8B:
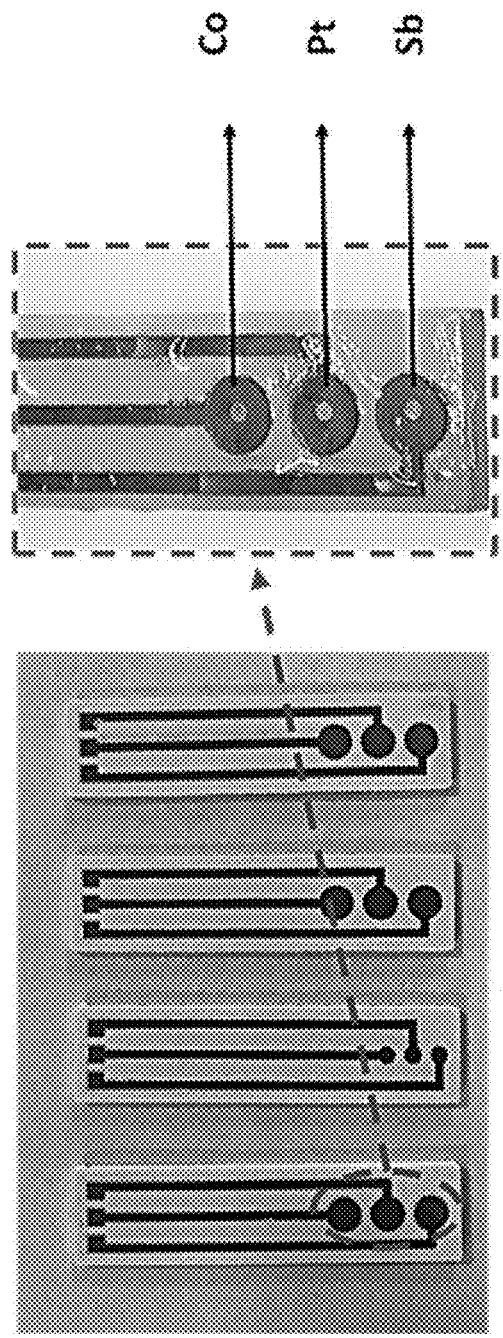
FIGS. 8A and 8B are images illustrating the milled copper electrodes and sensor elements (Co, Pt and Sb) disposed on the copper electrodes, in accordance with various embodiments of the present disclosure.

FIG. 8A is an image of the milled pattern of FIG. 7C on the substrate 703, and FIG. 8B is an enlarged image illustrating the deposited Co, Pt and Sb sensor electrodes 724a, 724b and 724c of FIG. 7I on patterned SU-8 substrate.

Figure 9A:
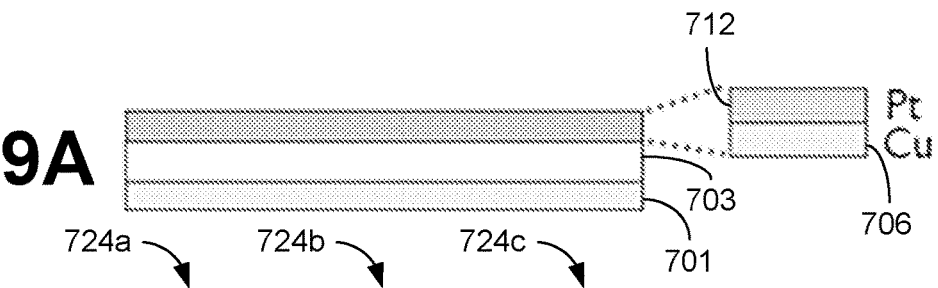
FIGS. 9A-9F graphically illustrate another example of a fabrication process for the P/pH sensors of FIGS. 1A and 1B, in accordance with various embodiments of the present disclosure.
Figure 9B:
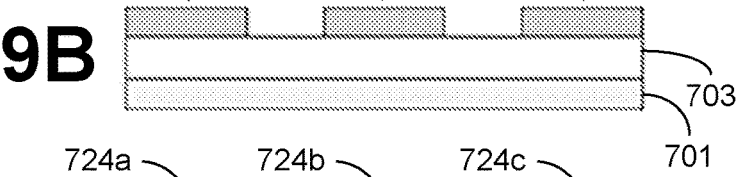

Referring next to FIGS. 9A-9D, another example of a process for fabrication of the combined P/pH sensors is described. Beginning with FIG. 9A, a layer of Pt 712 (e.g., about 100 nm) is disposed on a conductive copper layer 706 (e.g., in a range from about 100 nm to about 900 nm, from about 150 nm to about 750 nm, from about 200 nm to 500 nm, or combinations thereof) disposed on a substrate 703 (e.g., silicon, PCB, glass, etc.). The Pt/Cu layers 706/712 can then be patterned as illustrated in FIG. 9B to form sensor electrodes 724a, 724b and 724c on the substrate 703 using, e.g., PCB milling machine or silicon microfabrication techniques. The substrate 703 can have a copper (Cu) backplane 701 opposite the patterned Pt/Cu layers 706/712.

Figure 9C:
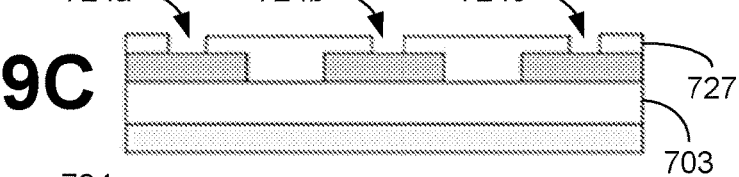
Figure 9D:
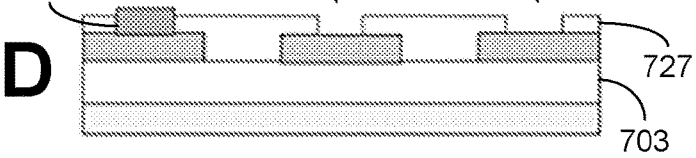
Figure 9E:
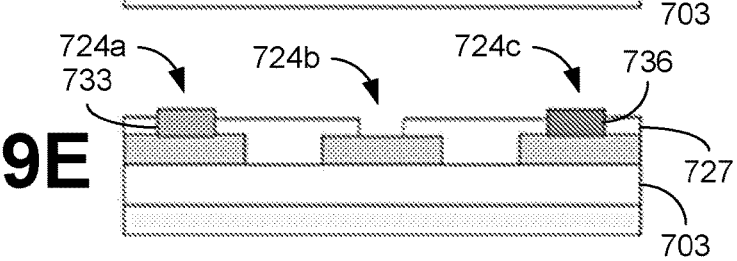

Next, the sensor electrodes 724 can be coated or covered by deposition of SU-8 727 (e.g., about 60 μm) using, e.g., a spin coating technique, and then photo lithography can be used to pattern the SU-8 727 over the sensor electrodes 724 to define sensor windows on the sensor electrodes 724 with development followed by hard bake of the SU-8 727 as shown in FIG. 9C. The P sensor electrode 724a is formed by electroplating a Co layer 733 on the Cu layer 718 as illustrated in FIG. 9D, and the pH sensor electrode 724c is formed electroplating a Sb layer 736 on the Cu layer 718 as illustrated in FIG. 9E. The Co layer 733 and Sb layer 736 can be in a range from, e.g., about 50 nm to about 50 μm, from about 100 nm to about 20 μm, from about 200 nm to about 10 μm, from about 300 nm to about 5 μm, from about 500 nm to about 2 μm, or combinations thereof.

Figure 9F:
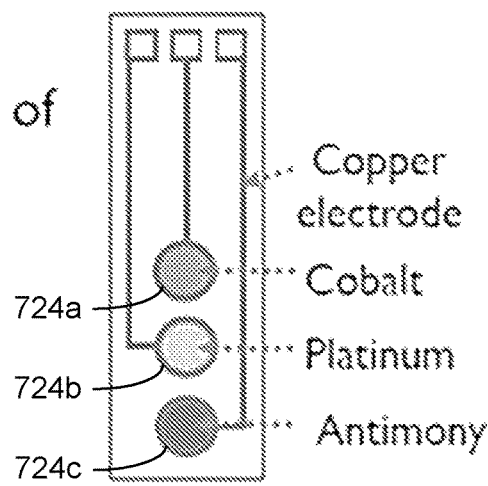
Figures 10A, 10B, 10C:
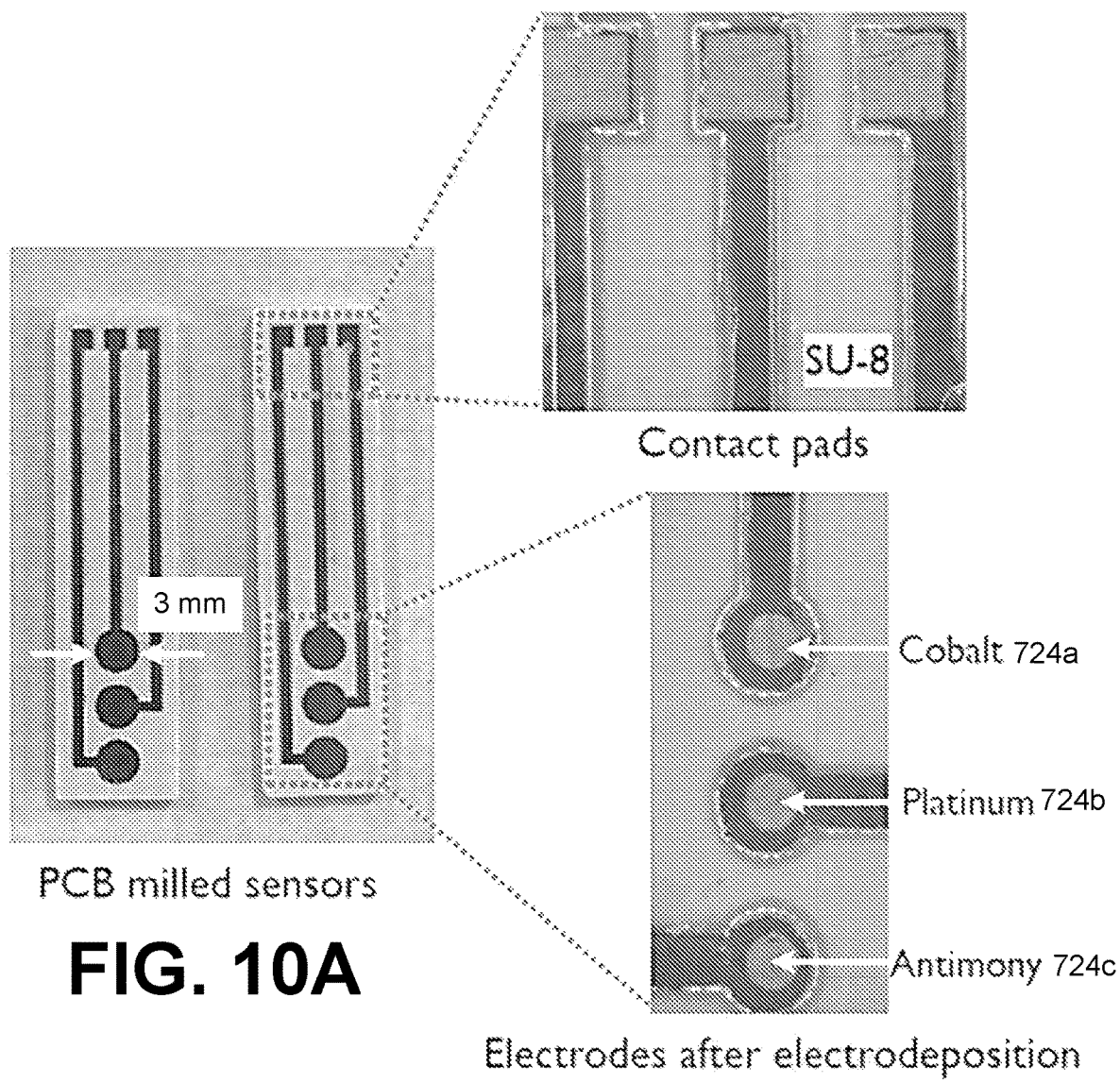
FIGS. 10A-10C are images illustrating the milled copper electrodes and sensor elements (Co, Pt and Sb) disposed on the copper electrodes, in accordance with various embodiments of the present disclosure.

FIG. 9F is a top view of illustrating an example of the fabricated P/pH sensor layout. FIG. 10A is an image of the milled pattern of FIG. 10B on the substrate 703, FIG. 10B is an enlarged image illustrating the deposited Co, Pt and Sb sensor electrodes 724a, 724b and 724c of FIG. 9E on patterned SU-8 substrate, and FIG. 10C shows an enlarged image of the contact pads to access the sensor electrodes 724.

The sensor can be expanded to include additional sensor electrodes. For example, a fourth nitrate ion electrode can be formed on the substrate 703. An ion selective membrane can be incorporated over a fourth electrode formed on the substrate for detecting $NO_3$ ions. Such membranes can be formed using, e.g., ligand (tetradodecyl ammonium nitrate, TDDA), plasticizer (nitrophenyl octyl ether, NPOE), polyvinyl chloride (PVC), and tetrahydrofuran (THF). In one embodiment, a selective membrane can be formed by preparing a mixture of 15% wt. of TDDA, 40% wt. of NPOE and 45% wt. of PVC and then dissolving the mixture in 2 mL of THF. The dissolved can then be poured into a plate (e.g., a ring-shaped plate) and evaporated (e.g., for 24 hours at room temperature). The membrane material can be removed and cut to produce membrane disk, which can be attached to the integrated sensor body.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'"includes "about 'x' to about 'y'".

Therefore, at least the following is claimed:

1. A phosphate/pH (P/pH) sensor, comprising:
a substrate;
a phosphate (P) electrode formed on a surface of the substrate, the P electrode comprising a cobalt (Co) sensing window disposed on a first copper (Cu) sensor pad, the Co sensing window comprising a first opening extending through a coating over the P electrode to a Co layer of a sensing element disposed on the first Cu sensor pad; and
a pH electrode formed on the surface of the substrate and collocated with the P electrode, the pH electrode comprising an antimony (Sb) sensing window disposed on a second Cu sensor pad, the Sb sensing window comprising a second opening extending through the coating over the P electrode to a Sb layer of a sensing element disposed on the second Cu sensor pad; and
a reference electrode formed on the surface of the substrate and collocated with the P electrode and the pH electrode, the reference electrode comprising a platinum (Pt) sensing window disposed on a third Cu sensor pad, the Pt sensing window comprising a third opening extending through the coating over the P electrode to a Pt layer of a sensing element disposed on the third Cu sensor pad.

2. The P/pH sensor of claim 1, wherein the Co sensing window and the Sb sensing window have diameters in a range from about 1 mm to about 3 mm.

3. The P/pH sensor of claim 2, wherein the first and second Cu sensor pads have diameters that are about twice the diameter of the corresponding Co or Sb sensing window.

4. The P/pH sensor of claim 2, wherein the Co and Sb sensing windows are the same size.

5. The P/pH sensor of claim 1, wherein the reference electrode is located between the P electrode and the pH electrode.

6. The P/pH sensor of claim 1, wherein the Co, Pt and Sb sensing windows are the same size.

7. The P/pH sensor of claim 1, wherein the Pt sensing window has a diameter in a range from about 1 mm to about 3 mm.

8. The P/pH sensor of claim 7, wherein the third Cu sensor pad has a diameter that is about twice the diameter of the Pt sensing window.

9. The P/pH sensor of claim 1, wherein the first and second Cu sensor pads are separated from the third Cu sensor pad by a separation distance equal to a radius of the Pt sensing window.

10. The P/pH sensor of claim 1, comprising a nitrate electrode formed on the surface of the substrate and collocated with the P electrode and the pH electrode, the nitrate electrode comprising a selective membrane disposed on a fourth Cu sensor pad.

11. The P/pH sensor of claim 10, wherein the selective membrane is a polyvinyl chloride (PVC) based membrane.

12. The P/pH sensor of claim 1, wherein the coating over the P electrode comprises SU-8.

13. A method for forming a combined phosphate/pH (P/pH) sensor, comprising:
   forming first, second and third sensor pads on a common substrate, the first, second and third sensor pads comprising:
      a base copper (Cu) layer disposed on the common substrate; and
      a platinum (Pt) layer disposed over the Cu layer;
   covering the first, second and third sensor pads with a coating of SU-8;
   defining sensor windows on the first, second and third sensor pads by patterning first, second and third openings through the coating of SU-8;
   forming a phosphate (P) sensing electrode by disposing a layer of cobalt (Co) over the Pt layer in the sensor window of the second sensor pad; and
   forming a pH sensing electrode by disposing a layer of antimony (Sb) over the Pt layer in the sensor window of the third sensor pad.

14. The method of claim 13, wherein the first, second and third sensor pads comprise:
   the base Cu layer disposed on the common substrate;
   a chromium (Cr) layer disposed on the base Cu layer;
   the Pt layer disposed on the Cr layer;
   a first titanium (Ti) layer disposed on the Pt layer;
   a second Cu layer disposed on the first Ti layer; and
   a second Ti layer disposed on the second Cu layer;
   wherein a reference electrode is formed by removing the second Ti layer, the second Cu layer and the first Ti layer from the sensor window of the first sensor pad;
   the P sensing electrode is formed by removing the second Ti layer from the sensor window of the second sensor pad and disposing the layer of Co on the second Cu layer in the sensor window of the second sensor pad; and
   the pH sensing electrode is formed by removing the second Ti layer from the sensor window of the third sensor pad and disposing the layer of Sb on the second Cu layer in the sensor window of the third sensor pad.

15. The method of claim 13, wherein the first, second and third sensor pads are collocated on the common substrate, the first sensor pad located between the second and third sensor pads.

16. The method of claim 13, wherein the first, second and third sensor pads are formed using PCB milling machine or silicon microfabrication techniques.

17. The method of claim 13, further comprising:
   forming a fourth sensor pad on the common substrate with the first, second and third sensor pads, the fourth sensor pad comprising the base Cu layer and the Pt layer; and
   forming a nitrate sensing electrode by attaching a selective membrane over the fourth sensor pad.

18. The method of claim 17, wherein the selective membrane is a polyvinyl chloride (PVC) based membrane.

19. The method of claim 18, wherein the selective membrane is formed by:
   preparing a mixture of 15% wt. of tetradodecyl ammonium nitrate (TDDA), 40% wt. of nitrophenyl octyl ether (NPOE) and 45% wt. of polyvinyl chloride (PVC) dissolved in 2mL of tetrahydrofuran (THF); and
   evaporating the mixture to form the selective membrane.

* * * * *